US011749846B2

(12) United States Patent
Fieldbinder et al.

(10) Patent No.: US 11,749,846 B2
(45) Date of Patent: Sep. 5, 2023

(54) FAST-CHARGING BATTERY PACK

(71) Applicant: MILWAUKEE ELECTRIC TOOL CORPORATION, Brookfield, WI (US)

(72) Inventors: Douglas R. Fieldbinder, Greendale, WI (US); Matthew R. Polakowski, Greenfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 783 days.

(21) Appl. No.: 16/425,570

(22) Filed: May 29, 2019

(65) Prior Publication Data
US 2019/0372067 A1 Dec. 5, 2019

Related U.S. Application Data

(60) Provisional application No. 62/678,050, filed on May 30, 2018.

(51) Int. Cl.
*H01M 50/209* (2021.01)
*H01M 10/44* (2006.01)
(Continued)

(52) U.S. Cl.
CPC ..... *H01M 10/441* (2013.01); *H01M 10/4207* (2013.01); *H01M 50/209* (2021.01);
(Continued)

(58) Field of Classification Search
CPC .................................................. H02M 50/209
(Continued)

(56) References Cited

U.S. PATENT DOCUMENTS 3,477,009 A   11/1969   Nichols
3,517,294 A    6/1970   Ruben
(Continued)

FOREIGN PATENT DOCUMENTS

CN   102452069 B   5/2012
CN   104319832 A   1/2015
(Continued)

OTHER PUBLICATIONS

International Search Report for International Patent Application No. PCT/US2019/034414 dated Sep. 20, 2019 (3 pages).
(Continued)

*Primary Examiner* — Yalkew Fantu
(74) *Attorney, Agent, or Firm* — Michael Best & Friedrich LLP

(57) ABSTRACT

One embodiment provides a battery pack including a housing, a plurality of battery cells supported by the housing, and a terminal block. The terminal block is configured to be coupled to a power tool to provide operating power from the plurality of battery cells to the power tool. The terminal block has a positive power terminal, a charging terminal, and a ground terminal. The battery pack also includes a charging circuit provided between the charging terminal and the plurality of battery cells. The charging circuit is configured to receive and transfer charging current above 12 Amperes to the plurality of battery cells during charging. The charging circuit includes a charging switch and a fuse coupled between the charging terminal and the charging switch.

20 Claims, 9 Drawing Sheets

(51) Int. Cl.
*H01M 10/42* (2006.01)
*H02J 7/00* (2006.01)

(52) U.S. Cl.
CPC .......... *H02J 7/0031* (2013.01); *H02J 7/0036* (2013.01); *H02J 7/00038* (2020.01); *H02J 7/0042* (2013.01)

(58) Field of Classification Search
USPC ........................................................ 320/112
See application file for complete search history.

(56) References Cited

U.S. PATENT DOCUMENTS

| | | | |
|---|---|---|---|
| 3,531,706 A | 9/1970 | Mullersman | |
| 3,623,139 A | 11/1971 | Dickerson | |
| 3,700,997 A | 10/1972 | Smith | |
| 3,863,129 A | 1/1975 | Yamauchi | |
| 3,968,168 A | 7/1976 | Strong | |
| 4,048,404 A | 9/1977 | Bro | |
| 4,609,860 A | 9/1986 | Fasen | |
| 4,639,656 A | 1/1987 | Mukai | |
| 4,712,055 A | 12/1987 | Houser | |
| 4,767,977 A | 8/1988 | Fasen et al. | |
| 5,130,634 A | 7/1992 | Kasai | |
| 5,166,596 A | 11/1992 | Goedken | |
| 5,177,427 A | 1/1993 | Bugaj | |
| 5,217,395 A | 6/1993 | Bailey et al. | |
| 5,225,763 A | 7/1993 | Krohn et al. | |
| 5,349,281 A | 9/1994 | Bugaj | |
| 5,350,996 A | 9/1994 | Tauchi | |
| 5,410,238 A | 4/1995 | Ishizuka et al. | |
| 5,500,584 A | 3/1996 | Shimomoto | |
| 5,557,188 A | 9/1996 | Piercey | |
| 5,576,612 A | 11/1996 | Garrett et al. | |
| 5,640,079 A | 6/1997 | Nelson et al. | |
| 5,642,027 A | 6/1997 | Windes et al. | |
| 5,675,235 A | 10/1997 | Nagai | |
| 5,845,217 A | 12/1998 | Lindell et al. | |
| 5,852,332 A | 12/1998 | Shearer | |
| 5,861,730 A | 1/1999 | Lee | |
| 5,880,576 A | 3/1999 | Nagai | |
| 5,912,546 A | 6/1999 | Sakou et al. | |
| 5,949,216 A | 9/1999 | Miller | |
| 6,008,629 A | 12/1999 | Saeki et al. | |
| 6,326,770 B1 | 12/2001 | Patino et al. | |
| 6,603,288 B2 | 8/2003 | Sakakibara | |
| 6,803,746 B2 | 10/2004 | Aker et al. | |
| 6,813,443 B1 | 11/2004 | Lin | |
| 6,859,014 B2 | 2/2005 | Bohne et al. | |
| 6,949,914 B2 | 9/2005 | Aradachi et al. | |
| 6,950,320 B2 | 9/2005 | Shin | |
| 6,992,464 B2 | 1/2006 | Takano et al. | |
| 7,208,917 B2 | 4/2007 | Yang | |
| 7,221,124 B2 | 5/2007 | Howard et al. | |
| 7,273,676 B2 | 9/2007 | Wheeler et al. | |
| 7,288,337 B2 | 10/2007 | Kim | |
| 7,301,308 B2 | 11/2007 | Aker et al. | |
| 7,323,849 B1 | 1/2008 | Robinett et al. | |
| 7,719,234 B2 | 5/2010 | Carrier et al. | |
| 7,839,119 B2 | 11/2010 | Onose | |
| 7,839,121 B2 | 11/2010 | Kim | |
| 7,982,428 B2 | 7/2011 | Kim | |
| 7,994,756 B2 | 8/2011 | Rowland | |
| 8,193,777 B2 | 6/2012 | Nakashima | |
| 8,217,628 B2 | 7/2012 | Yang et al. | |
| 8,604,754 B2 | 12/2013 | Cegnar et al. | |
| 8,618,769 B2 | 12/2013 | Johnson | |
| 8,674,657 B2 | 3/2014 | Kaino | |
| 8,698,457 B2 | 4/2014 | Hogari et al. | |
| 8,698,458 B2 | 4/2014 | Kim | |
| 8,729,851 B2 | 5/2014 | Bobbin et al. | |
| 8,963,505 B2 | 2/2015 | Odaohhara et al. | |
| 9,075,422 B2 | 7/2015 | Vemula | |
| 9,083,192 B2 | 7/2015 | Tinaphong et al. | |
| 9,142,993 B2 | 9/2015 | Kawai et al. | |
| 9,231,427 B2 | 1/2016 | Yasuda et al. | |
| 9,252,606 B1 | 2/2016 | Aronov et al. | |
| 9,276,421 B2 | 3/2016 | Weissinger et al. | |
| 9,634,511 B2 | 4/2017 | Zhao et al. | |
| 9,643,506 B2 | 5/2017 | Lei | |
| 9,664,745 B1 | 5/2017 | Fearn | |
| 9,689,753 B2 | 6/2017 | Ramey et al. | |
| 9,692,244 B2 | 6/2017 | Lee | |
| 9,721,723 B2 | 8/2017 | Lohr et al. | |
| 9,748,780 B2 | 8/2017 | Suzuki et al. | |
| 9,759,778 B2 | 9/2017 | Nagato | |
| 9,780,581 B2 | 10/2017 | Weissinger et al. | |
| 9,784,795 B2 | 10/2017 | Umemura et al. | |
| 9,800,074 B2 | 10/2017 | Adames | |
| 9,812,878 B1 | 11/2017 | Stieber et al. | |
| 9,859,548 B2 | 1/2018 | Cruise et al. | |
| 9,906,062 B2 | 2/2018 | Terlizzi et al. | |
| 10,431,857 B2 * | 10/2019 | Johnson | H02J 7/007 |
| 2003/0090239 A1 | 5/2003 | Sakakibara | |
| 2004/0070369 A1 | 4/2004 | Sakakibara | |
| 2005/0046387 A1 * | 3/2005 | Aker | H02J 7/02 320/125 |
| 2005/0077878 A1 * | 4/2005 | Carrier | H01M 10/441 320/134 |
| 2005/0275372 A1 | 12/2005 | Crowell | |
| 2006/0164031 A1 | 7/2006 | Leem | |
| 2008/0238370 A1 * | 10/2008 | Carrier | H01M 50/20 320/136 |
| 2009/0309547 A1 | 12/2009 | Nakatsuji | |
| 2010/0019737 A1 | 1/2010 | Leboeuf | |
| 2010/0085012 A1 | 4/2010 | Cruise et al. | |
| 2010/0148731 A1 | 6/2010 | Notten et al. | |
| 2010/0207581 A1 * | 8/2010 | Sakaue | H02J 7/0048 320/134 |
| 2011/0114350 A1 * | 5/2011 | Johnson | H02J 7/0068 173/217 |
| 2011/0248670 A1 | 10/2011 | Yamazaki et al. | |
| 2012/0104991 A1 | 5/2012 | Suzuki et al. | |
| 2013/0049675 A1 | 2/2013 | Minami | |
| 2013/0098646 A1 | 4/2013 | Funabashi et al. | |
| 2014/0091754 A1 | 4/2014 | Shum et al. | |
| 2014/0117922 A1 | 5/2014 | Pham | |
| 2015/0091497 A1 | 4/2015 | Leung et al. | |
| 2015/0180244 A1 | 6/2015 | Jung et al. | |
| 2015/0340894 A1 | 11/2015 | Horie et al. | |
| 2015/0340907 A1 | 11/2015 | Lei | |
| 2016/0118818 A1 | 4/2016 | Yamauchi | |
| 2016/0126755 A1 | 5/2016 | Kechmire et al. | |
| 2016/0285282 A1 | 9/2016 | Adrends | |
| 2016/0372801 A1 | 12/2016 | Clemente et al. | |
| 2016/0380263 A1 | 12/2016 | Nakayama et al. | |
| 2017/0005499 A1 | 1/2017 | Zhang et al. | |
| 2017/0040587 A1 | 2/2017 | Yang et al. | |
| 2017/0040822 A1 | 2/2017 | Li et al. | |
| 2017/0085108 A1 | 3/2017 | Zhang | |
| 2017/0117726 A1 | 4/2017 | Jore et al. | |
| 2017/0170439 A1 * | 6/2017 | Jarvis | H01M 50/578 |
| 2017/0288436 A1 | 10/2017 | Reed | |
| 2017/0294788 A1 | 10/2017 | Curtis | |
| 2017/0370994 A1 | 12/2017 | Nagato | |
| 2018/0003773 A1 | 1/2018 | Umemura et al. | |

FOREIGN PATENT DOCUMENTS

| | | |
|---|---|---|
| CN | 204145012 U | 2/2015 |
| DE | 3526045 C2 | 1/1987 |
| EP | 526874 A2 | 2/1993 |
| WO | WO 8401060 A1 | 3/1984 |
| WO | WO 8155209 A1 | 12/2008 |
| WO | WO 12029982 A2 | 3/2012 |
| WO | WO 13153889 A1 | 10/2013 |

OTHER PUBLICATIONS

Written Opinion for International Patent Application No. PCT/US2019/034414 dated Sep. 20, 2019 (6 pages).

(56) References Cited

OTHER PUBLICATIONS

Extended European Search Report for Application No. 19810056.2 dated Jan. 25, 2022 (8 pages).

\* cited by examiner

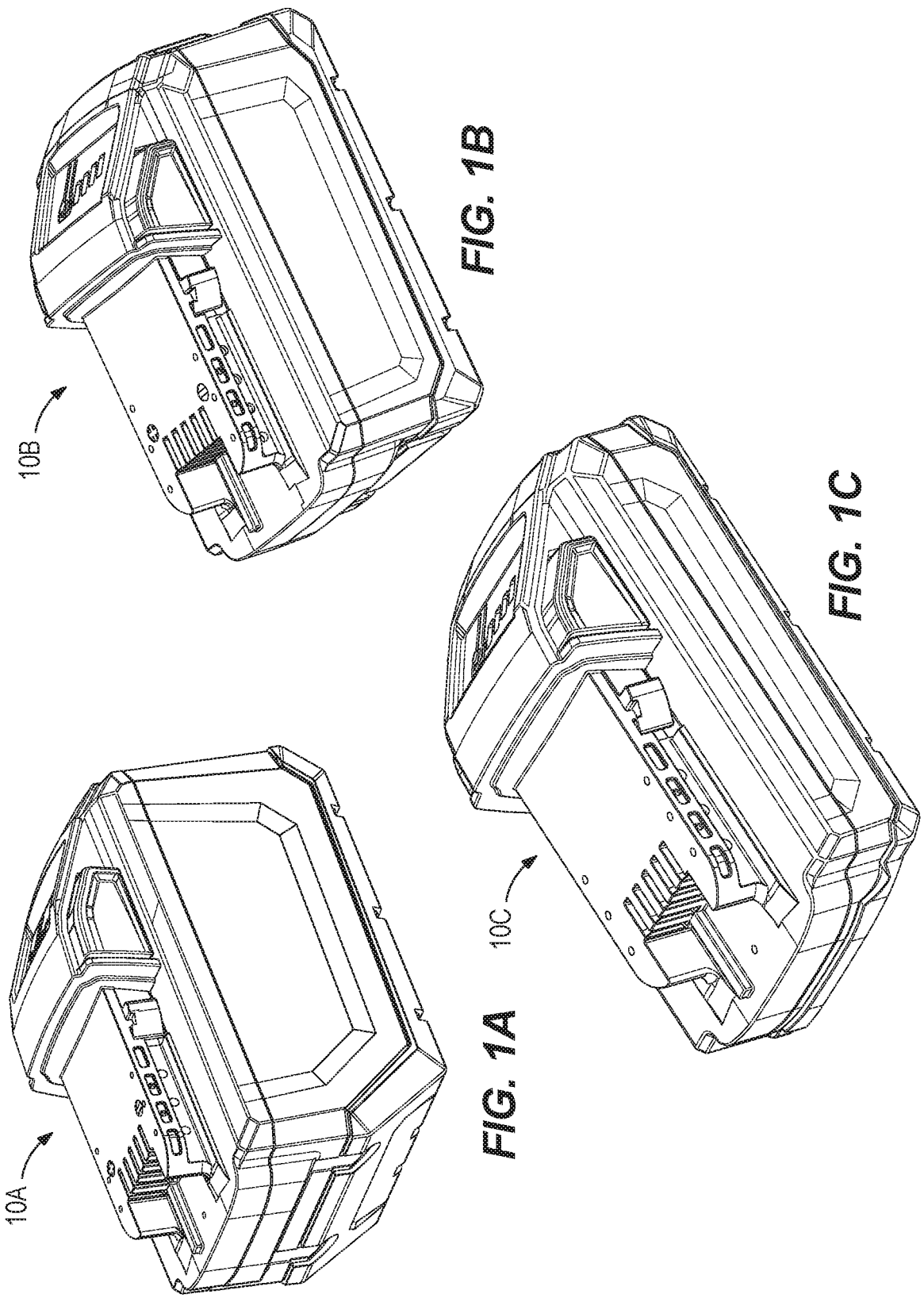

FAST-CHARGING BATTERY PACK

RELATED APPLICATIONS

This application claims priority to U.S. Provisional Patent Application No. 62/678,050, filed on May 30, 2018, the entire contents of which are hereby incorporated by reference

FIELD OF THE INVENTION

The present invention relates to battery packs for electrical devices, such as power tools, and, more particularly, to such battery packs capable of fast charging.

BACKGROUND OF THE INVENTION

Cordless electrical devices (e.g., electrical devices, such as power tools, outdoors tools, other motorized devices, non-motorized devices, etc.) have a limited run-time compared to comparable corded electrical devices. The run-time of cordless electrical devices generally depends on the capacity (ampere-hours (Ah)) of the associated battery pack. The capacity of a battery pack depends on the capacity of the individual battery cells and the number and configuration of those cells. For example, a "5S1P" battery pack includes one string of five series-connected battery cells. With battery cells having a capacity of about 1.3 Ah, the capacity of the 5S1P battery pack is about 1.3 Ah. The capacity of a "5S2P" battery pack (having two parallel-connected strings of five series-connected battery cells) is about 2.6 Ah. The capacity of a "5S3P" battery pack (having three parallel-connected strings of five series-connected battery cells) is about 3.9 Ah. The capacity of the 1P, 2P, and 3P packs will vary based on the capacity of the individual battery cells.

The charging time of a battery pack generally depends on the amount of current provided by the charger (and accepted by the battery pack), the capacity of the battery cells, and the overall capacity of the battery pack. For example, a battery pack including battery cells having a capacity of 1.3 Ah being charged by a charger providing a charging current of 3 Amps (A) takes about 35-40 minutes to reach full charge. The higher the capacity of the battery cells, the longer the charging time to fully charge the battery pack. With the same 3 A charging current, the 3.9 Ah battery pack takes about 75-80 minutes to reach full charge.

While it may be desirable to increase the charging current to decrease the time to charge battery packs with higher capacity cells (e.g., provide a charging current of between about 6 A and about 18 A for battery packs with cells having a capacity of between about 3 Ah and about 4 Ah), components of the battery pack (e.g., the printed circuit board (PCB), a fuse, a field effect transistor (FET)) may not be capable of handling increased current (e.g., more than about 6 A) without adverse effects, such as excessive heating, wear, irreversible damage, etc. Accordingly, there may be a need for battery packs having charging circuitry and components able to handle charging current in the range of more than about 6 A to about 18 A or even higher.

SUMMARY OF THE INVENTION

One embodiment provides a battery pack including a housing, a plurality of battery cells supported by the housing, and a terminal block. The terminal block is configured to be coupled to a power tool to provide operating power from the plurality of battery cells to the power tool. The terminal block has a positive power terminal, a charging terminal, and a ground terminal. The battery pack also includes a charging circuit provided between the charging terminal and the plurality of battery cells. The charging circuit is configured to receive and transfer charging current above 12 Amperes to the plurality of battery cells during charging. The charging circuit includes a charging switch and a fuse coupled between the charging terminal and the charging switch.

In some constructions, the charging switch may include a N-Channel FET. The fuse may have at least about a 8 A rating; in some constructions, the fuse may have about a 20 A rating. The battery pack may include an electronic controller, the controller being configured to control the FET to selectively connect the charging terminal to the battery cells.

Another embodiment provides a battery pack charging system including a charger configured to provide a charging current between about 6 Amperes and about 20 Amperes and a battery pack detachably connectable to the charger and configured to be charged by the charger. The battery pack includes a plurality of battery cells and a terminal block. The terminal block is configured to be coupled to a power tool to provide operating power from the plurality of battery cells to the power tool. The terminal block has a positive power terminal, a charging terminal, and a ground terminal. The battery pack also includes a charging circuit provided between the charging terminal and the plurality of battery cells. The charging circuit is configured to receive and transfer charging current above 12 Amperes to the plurality of battery cells during charging. The charging circuit includes a charging switch and a fuse coupled between the charging terminal and the charging switch.

Other independent aspects of the invention may become apparent by consideration of the detailed description and accompanying drawings.

BRIEF DESCRIPTION OF THE DRAWINGS

FIGS. 1A-1E are perspective views of battery packs for electrical devices, such as power tools, outdoors tools, other motorized devices, non-motorized devices, etc.

DETAILED DESCRIPTION

Figure 1D:
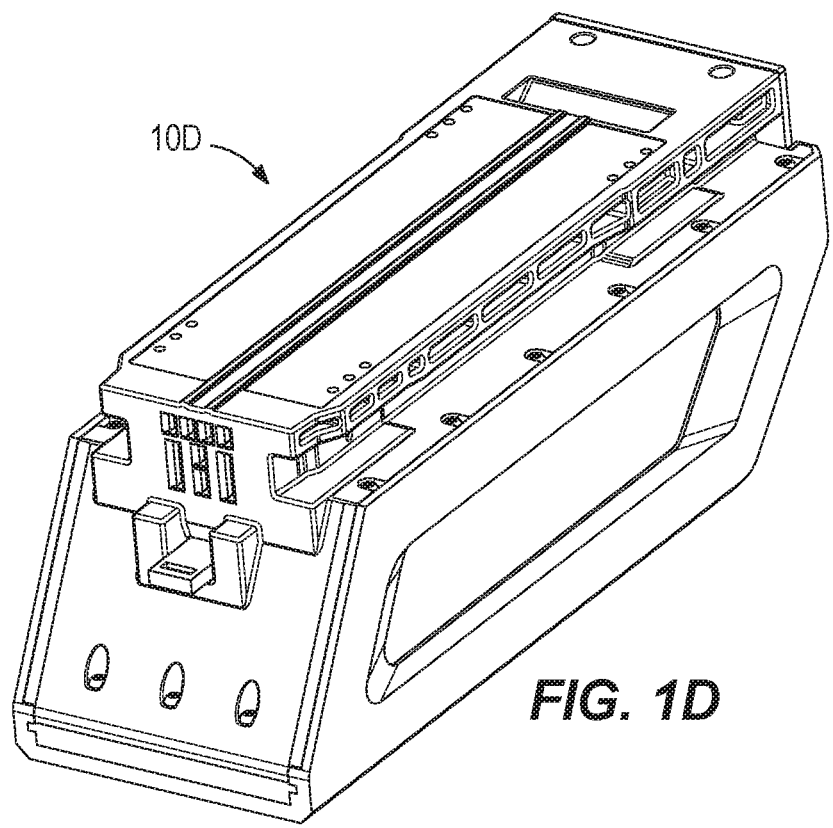

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use) associated with the particular value, etc.). Such terminology should also be considered as disclosing the range defined by the absolute values of the two endpoints. For example, the expression "from about 2 to about 4" also discloses the range "from 2 to 4".

The relative terminology may refer to plus or minus a percentage (e.g., 1%, 5%, 10% or more) of an indicated value. For example, with a 10% range, "about 20 Volts" may indicate a range of 18 Volts (V) to 22 V, and "about 1%" may mean from 0.9-1.1. Other meanings of relative terms may be apparent from the context, such as rounding off, so, for example "about 20 V" may also mean from 19.5 V to 20.4 V.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

FIGS. 1A-1E illustrate several embodiments of a battery pack 10 operable to power cordless electrical devices (e.g., electrical devices, such as power tools, outdoors tools, other motorized devices, non-motorized devices, etc.). FIG. 1A illustrates a battery pack 10A having a "5S3P" configuration (three parallel-connected strings of five series-connected battery cells), FIG. 1B illustrates a battery pack 10B having a "5S2P" configuration (two parallel-connected strings of five series-connected battery cells), and FIG. 1C illustrates a battery pack 10C having a "5S1P" configuration (one string of five series-connected battery cells). Similar battery packs are described and illustrated in U.S. Provisional Patent Application Nos. 62/536,807, filed Jul. 25, 2017, and 62/570,828, filed Oct. 11, 2017, entitled "HIGH POWER BATTERY-POWERED SYSTEM," and U.S. patent application Ser. No. 16/045,513, filed on Jul. 25, 2018, the entire contents of all of which are hereby incorporated by reference.

Figure 1E:
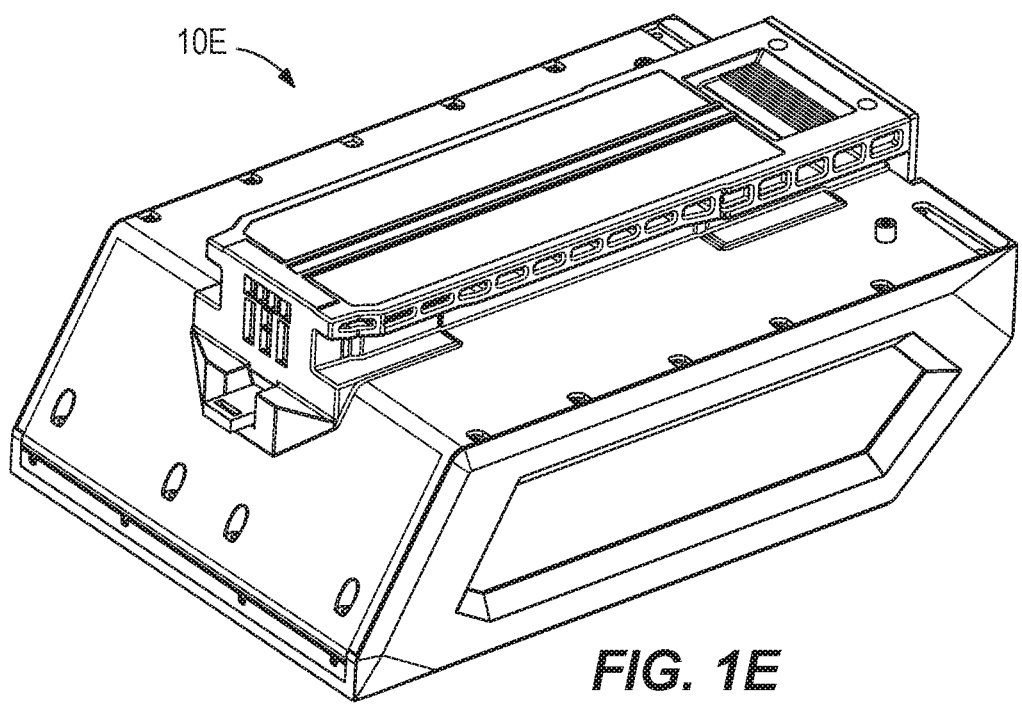

FIG. 1D illustrates a battery pack 10D having a "20S1P" configuration (one string of twenty series-connected cells), and FIG. 1E illustrates a battery pack 10E having a "20S2P" (two parallel-connected strings of twenty series-connected cells). Similar battery packs are described and illustrated in U.S. Provisional Patent Application No. 62/527,735, filed Jun. 30, 2017, entitled "HIGH POWER BATTERY-POWERED SYSTEM," and U.S. patent application Ser. No. 16/025,491, filed on Jul. 2, 2018, the entire contents of both of which are hereby incorporated by reference.

The battery pack 10 includes battery cells 14 having a nominal voltage (e.g., between about 3 volts (V) and about 5 V) and a nominal capacity (e.g., between about 3 Amp-hours (Ah) and about 5 Ah or more (e.g., up to about 9 Ah)). The battery cells may be any rechargeable battery cell chemistry type, such as, for example, lithium (Li), lithium-ion (Li-ion), other lithium-based chemistry, nickel-cadmium (NiCd), nickel-metal hydride (NiMH), etc.

The battery pack 10 includes a number and arrangement of battery cells 14 to provide a desired output (e.g., nominal voltage, capacity, etc.) In FIGS. 1A-1C, the battery packs 10A-10C have a nominal voltage of between about 16 V and about 21 V, and the capacity of the battery pack 10A is about three times the capacity of the battery pack 10C (e.g., about 9 Ah compared to about 3 Ah). In FIGS. 1D-1E, the battery packs 10D-10E have a nominal voltage of between about 72 V and about 84 V, and the capacity of the battery pack 10E is about two times the capacity of the battery pack 10D (e.g., about 6 Ah compared to about 3 Ah).

Figure 2:
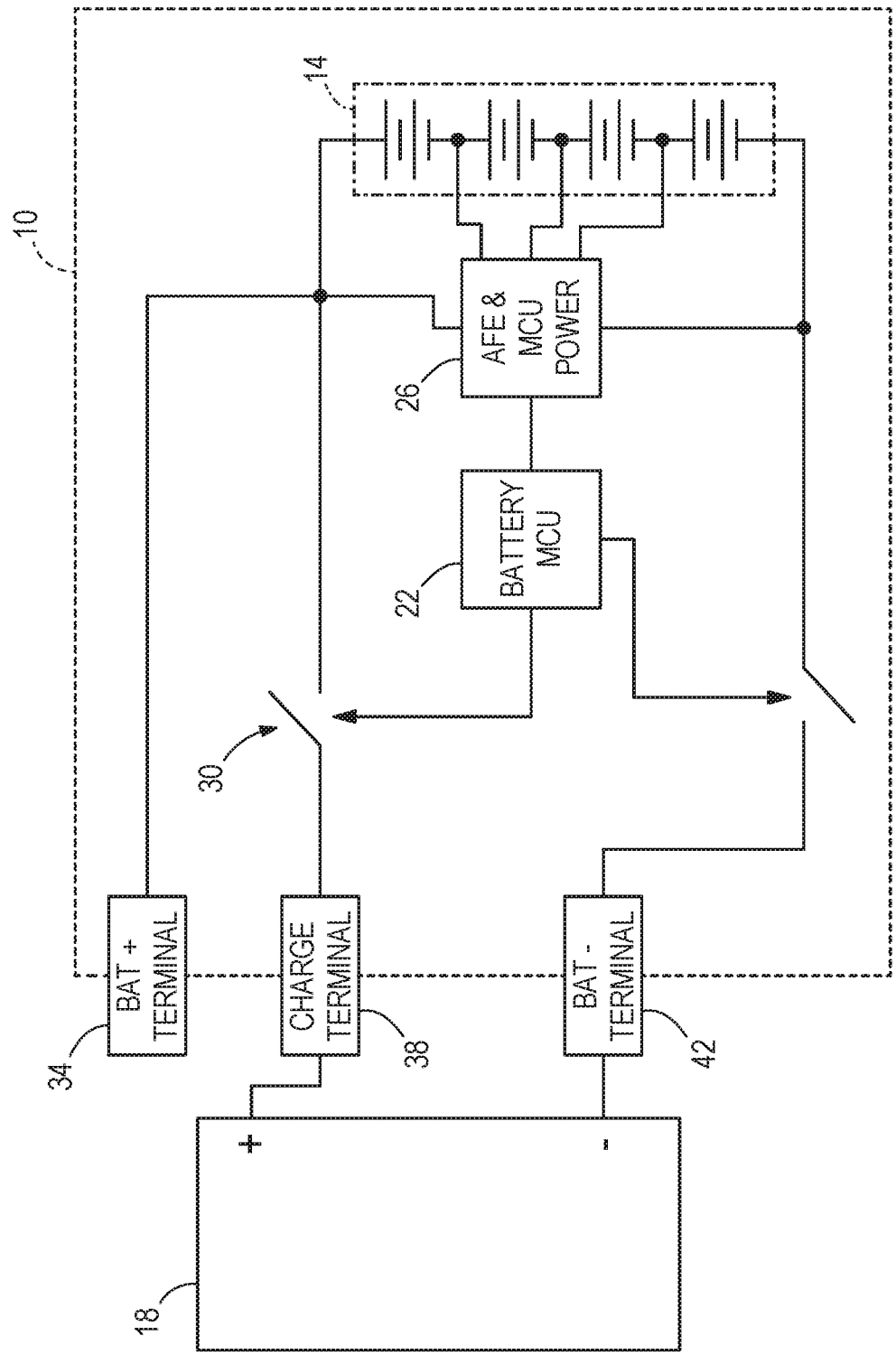
FIG. 2 is a block diagram of a battery pack connected to a fast-charging battery charger.

FIG. 2 is a block diagram illustrating the battery pack 10 coupled to a charger 18. The battery pack 10 includes the battery cells 14, a battery controller 22, an analog front end (AFE) 26, a charging field effect transistor (FET) 30, a positive battery terminal 34, a positive charging terminal 38, and a ground terminal 42.

The positive battery terminal 34 and the ground terminal 42 are coupled to corresponding power terminals of a powered electrical device to provide operating power to the electrical device. The positive charging terminal 38 and the ground terminal 42 are coupled to corresponding charging terminals of the charger 18 to receive a charging current from the charger 18. The charging FET 30 is coupled between the positive charging terminal 38 and the battery cells 14 to selectively provide the charging current to the battery cells 14.

The charging FET 30 is controlled to open or close by the battery controller 22. When the charging FET 30 is open, the battery cells 14 are disconnected from the charger 18 and, therefore, do not receive the charging current. When the charging FET 30 is closed, the battery cells 14 are connected to the charger 18 and, therefore, receive the charging current. The AFE 26 individually monitors and balances the battery cells 14 and provides operating power to the battery controller 22.

Figure 3:
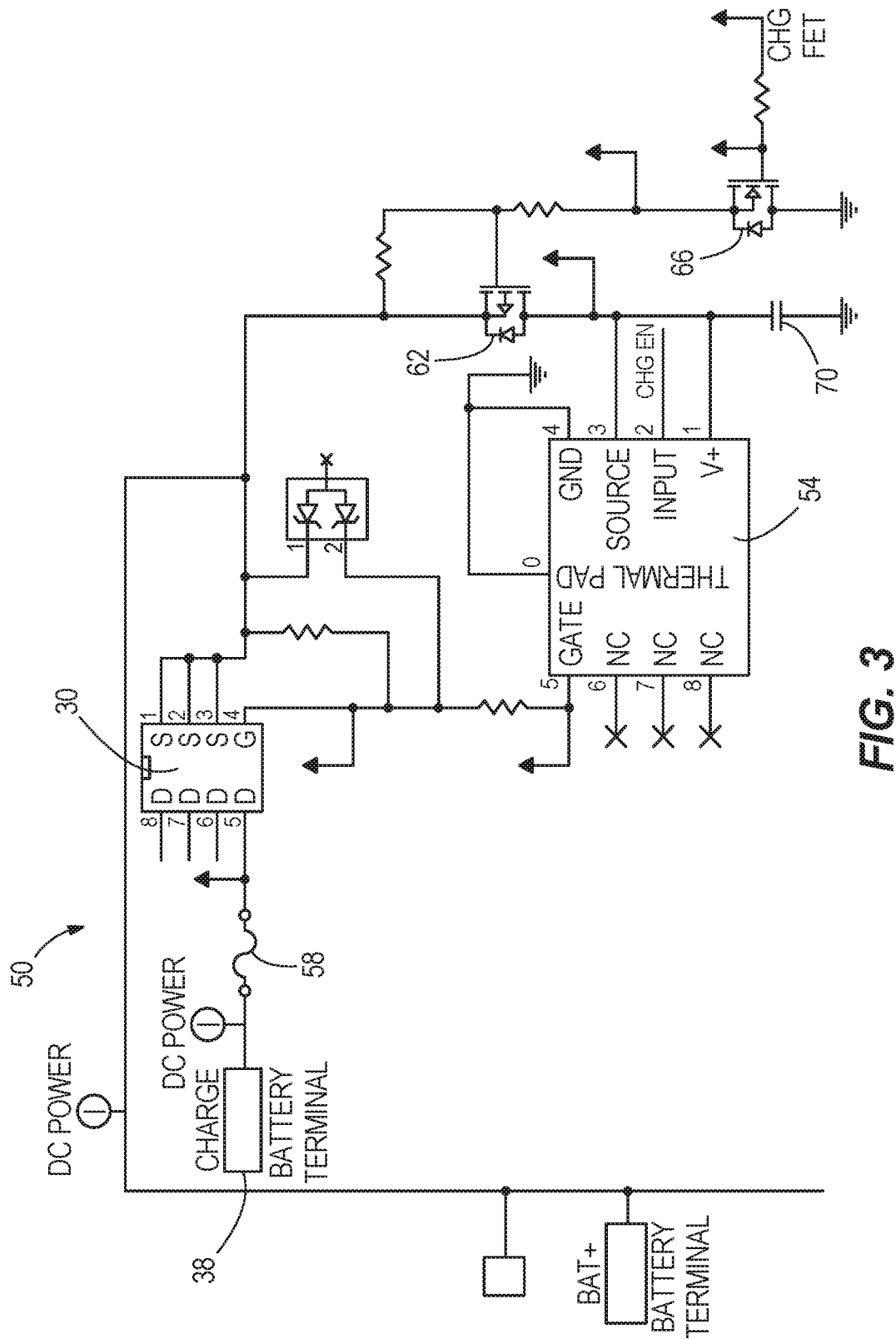
FIG. 3 is a block diagram of a charging circuit of the battery pack.

FIG. 3 illustrates one example embodiment of a charging circuit 50 implemented in the battery pack 10. The illustrated charging circuit 50 includes the charging FET 30, a gate driver 54, and a fuse 58. In the illustrated example, the charging FET 30 includes a 40V N-Channel power MOSFET, for example, a 40V N-Channel power NexFET™ MOSFET CSD18511Q5A manufactured by Texas Instruments. The N-Channel FET may have a lower drain-source on resistance $R_{DS(on)}$ and less current loss per unit area compared to a P-Channel FET. Compared to other charging circuits in which a charging FET and a fuse may limit the charging current to about 6 A, in the illustrated construction, the FET 30 and the fuse 58 may allow higher charging currents more than about 6 A to about 18 A or even higher (e.g., up to about 20 A).

The drain D of the charging FET 30 is coupled to the charging terminal 38 through the fuse 58. The source S of the charging FET 30 is coupled to the battery cells 14 and, in particular, to the most positive terminal of the one or more strings of battery cell 14. The source S of the charging FET 30 is also coupled to a source input of the gate driver 54. The gate G of the charging FET 30 is coupled to a gate output of the gate driver 54. As described above, the charging FET 30 selectively couples the charger 18 to the battery cells 14.

The gate driver 54 is used to drive the charging FET 30. In one example, the gate driver 54 is an ultra-small low-side MOSFET driver MC5060 manufactured by Micrel. As described above, a source input of the gate driver 54 is coupled to the source S of the charging FET 30, and the gate output of the gate driver 54 is coupled to the gate G of the charging FET 30. The gate driver 54 receives operating power from the battery cells 14 at a positive power supply input V+. The gate driver 54 receives a control input CHG EN from the battery controller 22. The battery controller 22 provides control signals to open or close the charging FET 30 to the gate driver 54 through the control input CHG EN. In response to the control signals received from the battery controller 22, the gate driver 54 opens or closes the charging FET 30 to selectively connect the charger 18 to the battery cells 14.

A first switch 62 is coupled between the battery cells 14 and the power supply input V+. The drain of the first switch 62 is coupled to the battery cells 14, and the source of the first switch 62 is coupled to the power supply input V+. The gate of the first switch 62 is controlled by a second switch 66, and the gate of the second switch 66 is controlled by the battery controller 22 using a control signal CHG FET. The battery controller 22 sets the control signal CHG FET to a logical high to close the second switch 66 and sets the control signal CHG FET to a logical low to open the second switch 66. The first switch 62 is closed when the second switch 66 is closed, and the first switch 62 is opened when the second switch 66 is opened.

A capacitor 70 (for example, a timer circuit) is coupled between the positive power input V+ and ground. When the first switch 62 is enabled, the capacitor 70 is first charged before the gate driver 54 is controlled to open the charging FET 30. The capacitance value of the capacitor 70 may be selected to control the amount of time for the capacitor 70 to reach full charge (i.e., a time constant).

The charger 18 is configured to provide a charging current between about 6 A and about 20 A to charge the battery pack 10. The charger 18 may provide a charging current corresponding to the configuration of the battery pack 10. In one embodiment, the charger 18 provides a charging current of about 6 A to charge the 5S1P battery pack 10C (or the 20S1P battery pack 10D), provides a charging current of about 12 A to charge the 5S2P battery pack 10B (or the 20S2P battery pack 10E), and provides a charging current of about 18 A to charge the 5S3P battery pack 10A.

In some embodiments, the charger 18 may limit the maximum charging current to about 13.5 A regardless of the configuration of the battery pack 10. Accordingly, the charger 18 provides a maximum charging current of about 13.5 A to the 5S3P battery pack 10A. The charging FET 30 and the fuse 58 are selected to allow fast charging of the battery pack 10 at high currents as described above. The illustrated charging FET 30 may be configured to handle a voltage of 40 V and a maximum current of approximately 20 A or more. The illustrated fuse 58 is, for example, an 8 A fuse rated to allow a maximum current of 13.5 A. In other embodiments, the fuse 58 may be rated (e.g., a 20 A fuse) to handle higher maximum currents, for example, up to 18 A or 20 A.

Figure 4:
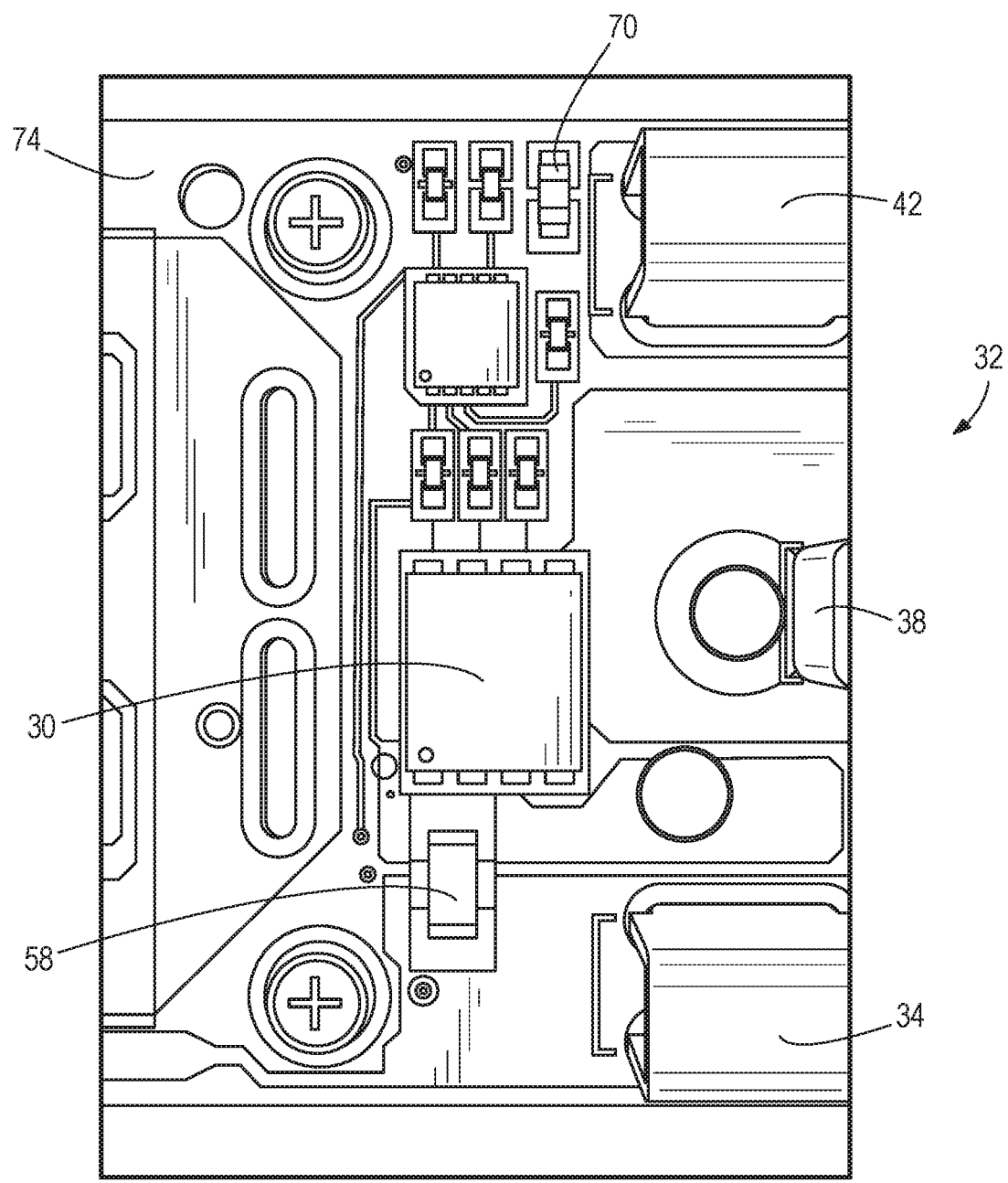
FIG. 4 is a schematic illustration of the charging circuit of FIG. 3 on a circuit board of the battery pack.

FIG. 4 illustrates placement of components of the illustrated charging circuit 50 on a printed circuit board 74 of the battery pack 10. The charging FET 30, the fuse 58, and the capacitor 70 are placed immediately behind the terminal block 32 (including the positive battery terminal 34, the charging terminal 38, and the ground terminal 42).

Figure 5:
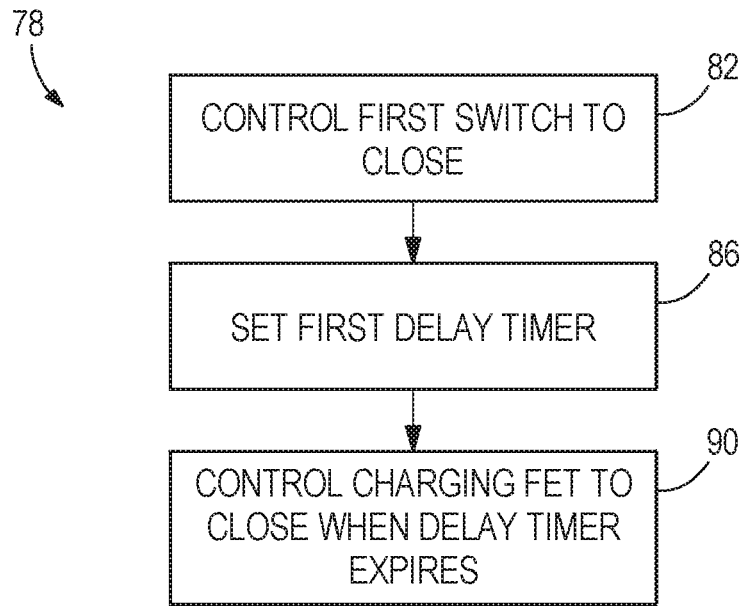
FIG. 5 is a flowchart illustrating a method of enabling fast charging of the battery pack.

FIG. 5 is a flowchart of an example method 78 for enabling fast charging of the battery pack 10. The battery controller 22 enables charging of the battery cells 14 in response to detecting a connection to the charger 18. The illustrated method 78 includes controlling, using the battery controller 22, the first switch 62, coupled between the battery cells 14 and the power supply input V+ of the gate driver 54, to close (at block 82). The battery controller 22 opens the first switch 62 by setting the control signal CHG FET to high. As described above, the control signal CHG FET closes the second switch 66 which, in turn, closes the first switch 62. When the first switch 62 is closed, the power supply input V+ of the gate driver 54 is coupled to the battery cells 14, thereby providing operating power supply to the gate driver 54.

The method 78 includes setting, using the battery controller 22, a first delay timer corresponding to a time to full charge of the capacitor 70 coupled between the power supply input V+ and ground (at block 86). The battery controller 22 waits for the capacitor 70 to reach full charge by setting a timer corresponding to the amount of time the capacitor 70 takes to reach full charge.

The method 78 further includes controlling, using the battery controller 22, the charging FET 30 to close when the first delay timer expires (at block 90). The battery controller 22 waits for the capacitor 70 to reach full charge before providing an enable signal to the control input CHG EN. The gate driver 54 controls the charging FET 30 to close to charge the battery cells 14 in response to the gate driver 54 receiving the enable signal over the control input CHG EN.

Figure 6:
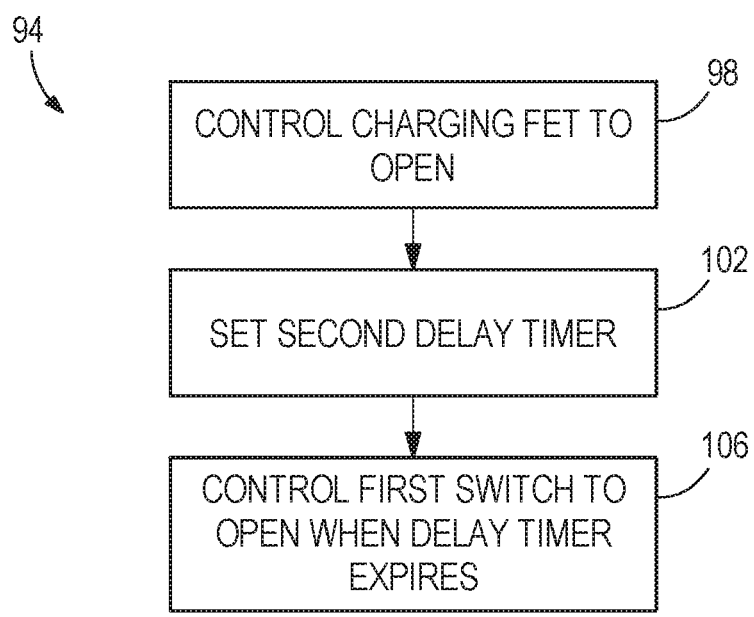
FIG. 6 is a flowchart illustrating a method of disabling fast charging of the battery pack.

FIG. 6 is a flowchart of an example method 94 for disable fast charging of the battery pack 10. The battery controller 22 disables charging of the battery cells 14 in response to, for example, detecting that the battery pack 10 is fully charged, disabled due to a fault condition, etc. or in response to detecting that the charger 18 is disconnected from the battery pack 10.

The illustrated method 94 includes controlling, using the battery controller 22, the charging FET 30 to open (at block 98). The battery controller 22 provides a disable signal to the control input CHG EN. When the gate driver 54 receives the disable signal over the control input CHG EN, the gate driver 54 control the charging FET 30 to open to disable charging of the battery cells 14.

The method 94 includes setting, using the battery controller 22, a second delay timer to ensure that the charging FET 30 is completely switched OFF (at block 102). The method 94 further includes controlling, using the battery controller 22, the first switch 62, coupled between the battery cells 14 and the power supply input V+ of the gate driver 54, to open when the second delay timer expires (at block 106). The battery controller 22 waits for the charging FET 30 to be completely switched OFF before disabling the gate driver 54. When the second delay timer expires, the battery controller 22 opens the second switch 66 to open the first switch 62. The battery controller 22 thereby disables the power supply to the gate driver 54.

Figure 7:
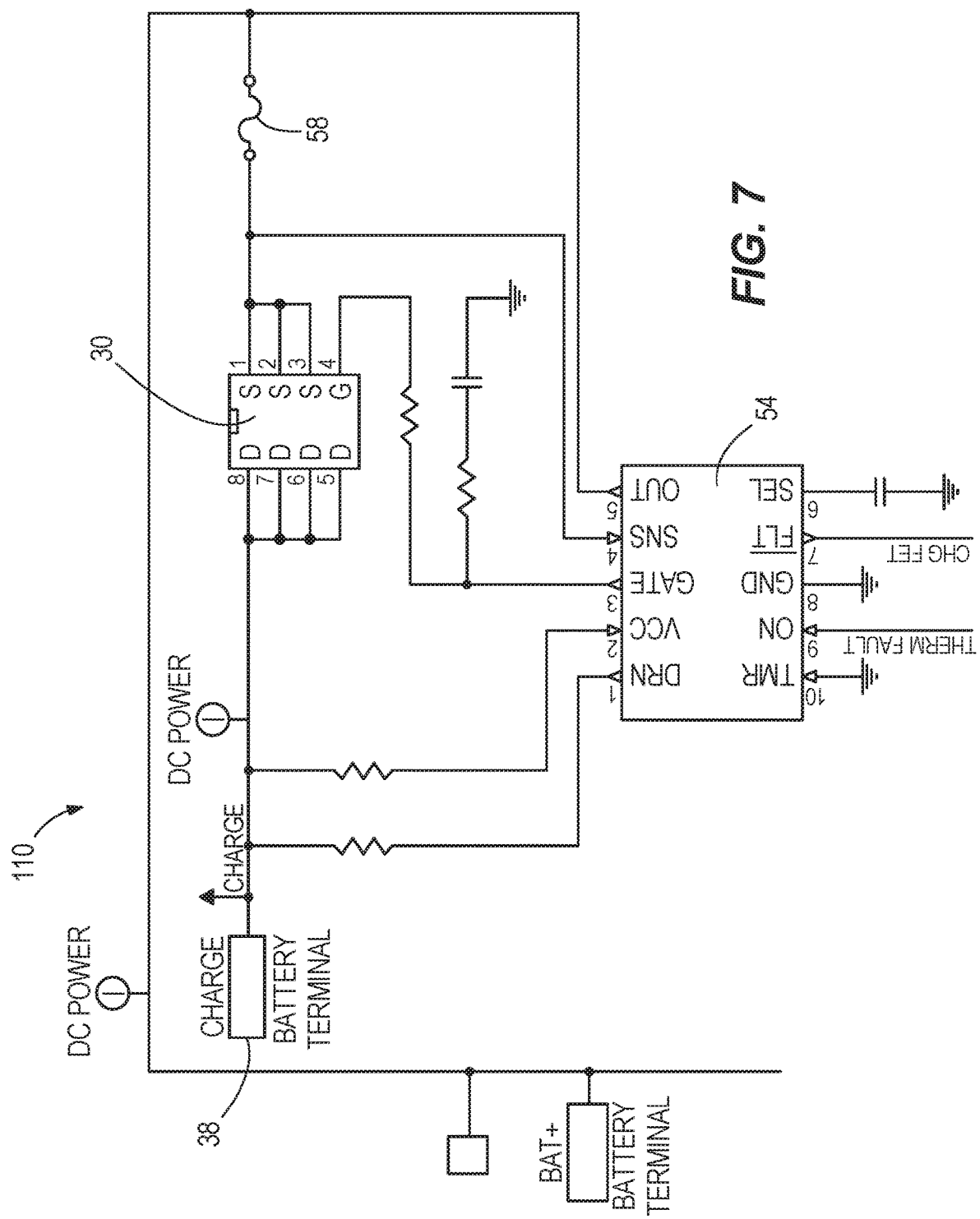
FIG. 7 is a block diagram of a charging circuit of the battery pack.

FIG. 7 illustrates one example embodiment of a charging circuit 110 implemented in the battery pack 10. The illustrated charging circuit 110 is similar to the charging circuit 50, except that the gate driver 54 is on the high-side of the charging FET 30 rather than the low-side of the charging FET 30 such that the gate driver 54 receives operating power from the charging terminal 38. In the example illustrated, the charging FET includes a 200 V 36A N-Channel MOSFET BSC320N20NS3 manufactured by Infineon Technologies. The gate driver 54 is a surge protector LTC4380CMS manufactured by Linear Technologies.

Figure 8:
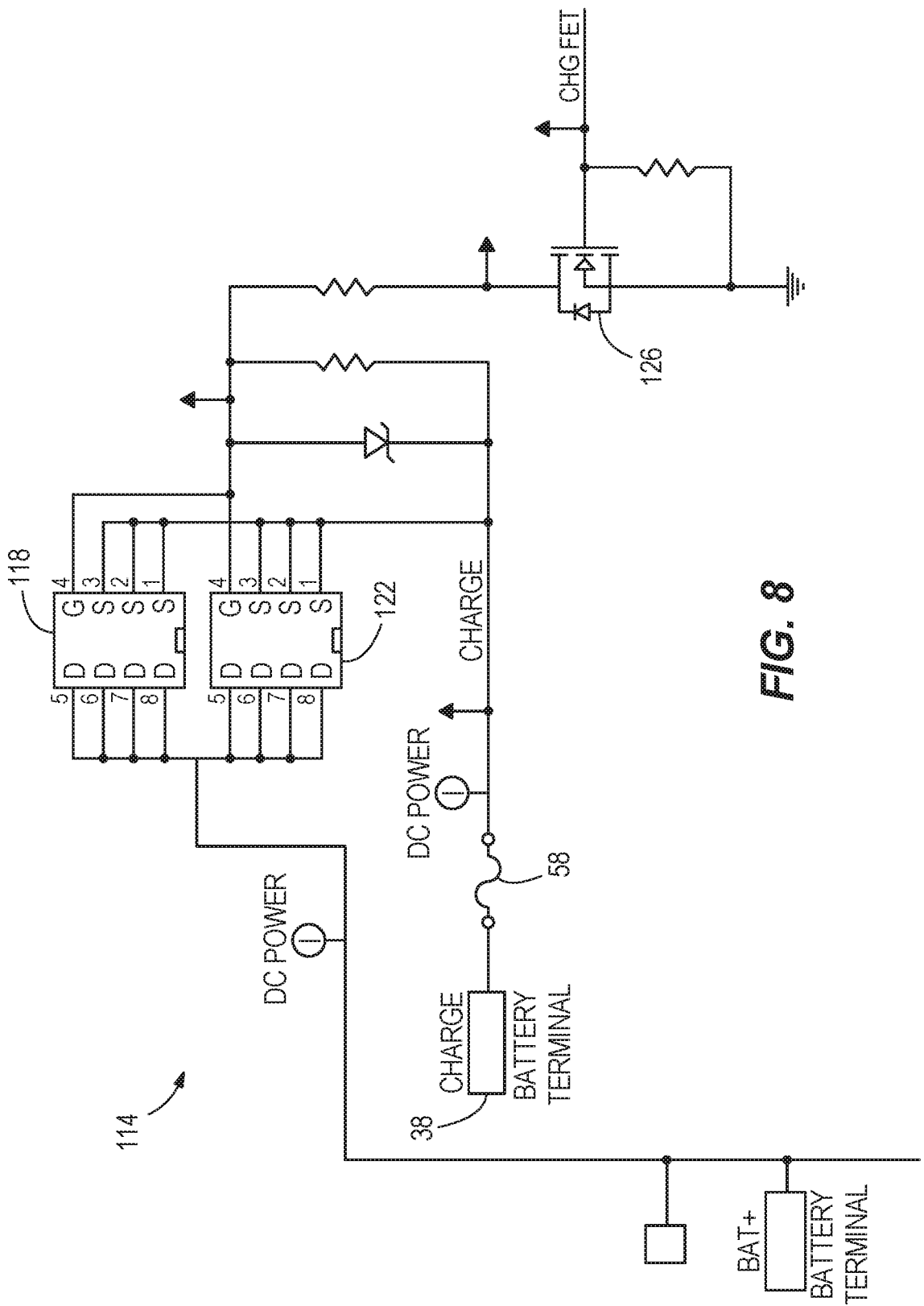
FIG. 8 is a block diagram of a charging circuit of the battery pack.

FIG. 8 illustrates one example embodiment of a charging circuit 114 implemented in the battery pack 10. The illustrated charging circuit 114 includes a first charging FET 118, a second charging FET 122, and a fuse 58. In the illustrated example, the first charging FET 118 and the second charging FET 122 include 40V P-Channel power MOSFET, for example, a 40V P-Channel MOSFETs SiS443DN manufactured by Vishay® Siliconix.

The drain D of each charging FET 118, 122 is coupled to the charging terminal 38 through the fuse 58. The source S of each charging FET 118, 122 is coupled to the battery cells 14 and, in particular, to the most positive terminal of the one or more strings of battery cell 14. The gate G of each charging switch 118, 122 is coupled to a switch 126. The battery controller 22 controls the switch 126 to open and close the charging FETs 118, 122. For example, the battery controller 22 opens the switch 126 to open the charging FETs 118, 122 and closes the switch 126 to close the charging FETs 118, 122.

Figure 9:
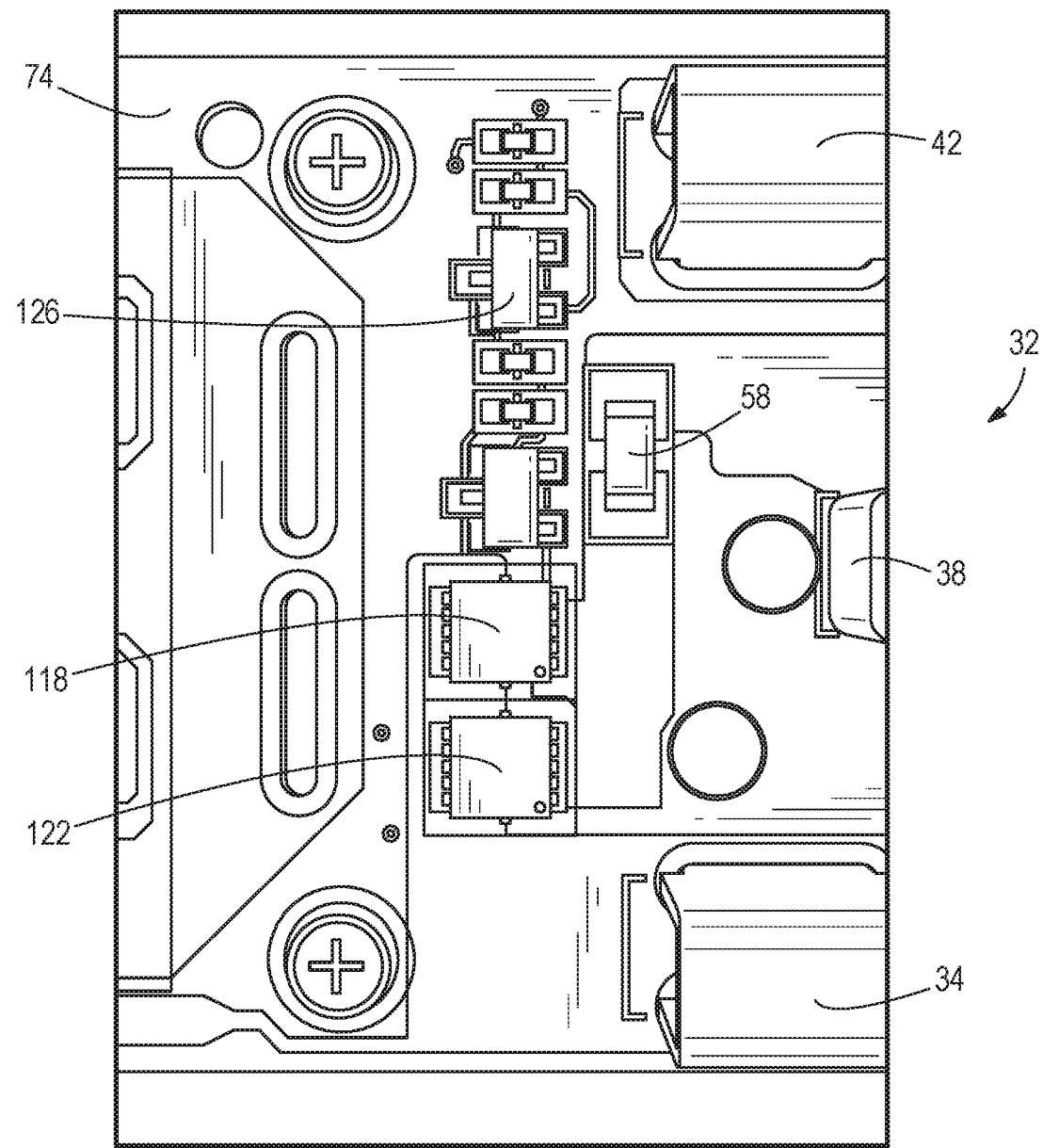
FIG. 9 is a schematic illustrating the charging circuit of FIG. 7 on a circuit board of the battery pack.

FIG. 9 illustrates placement of components of the illustrated charging circuit 114 on the printed circuit board 74 of the battery pack 10. The charging FETs 118, 122 and the fuse 58 are placed immediately behind the terminal block 32 (including the positive battery terminal 34, the charging terminal 38, and the ground terminal 42).

In other constructions (not shown), the charging circuit 50, 110, 114 may not include a fuse, such as the fuse 58. In such constructions, the voltage may be measured across the FET (e.g., the FET 30 or the FET(s) 118 or 122), and the current through the FET may be determined (e.g., by the controller 22) based on a known internal resistance. If the calculated current is above a threshold, the FET can open.

Thus, the invention may provide, among other things, fast-charging battery packs.

Although the invention has been described in detail with reference to certain preferred embodiments, variations and modifications exist within the scope and spirit of one or more independent aspects of the invention as described.

One or more independent features and/or independent advantages of the invention may be set forth in the claims.

The invention claimed is:

1. A battery pack, comprising:
   a housing;
   a plurality of battery cells supported by the housing, the plurality of battery cells and the battery pack having a nominal capacity of up to about 15 Amp-hours (Ah);
   a terminal block configured to be coupled to a power tool to provide operating power from the plurality of battery cells to the power tool, the terminal block having a positive power terminal, a charging terminal, and a ground terminal; and
   a charging circuit provided between the charging terminal and the plurality of battery cells, the charging circuit configured to receive and transfer charging current above 12 Amperes to the plurality of battery cells during charging, wherein the charging circuit includes:
   a charging switch; and
   a fuse coupled between the charging terminal and the charging switch.

2. The battery pack of claim 1, further comprising a battery controller coupled to the charging circuit.

3. The battery pack of claim 2, further comprising a gate driver coupled between the battery controller and the charging switch, wherein the battery controller controls the charging switch using the gate driver.

4. The battery pack of claim 3, wherein the gate driver is coupled on a high side of the charging switch such that the gate driver receives operating power from the charging terminal.

5. The battery pack of claim 3, further comprising:
   a first switch coupled between the battery cells and the gate driver; and
   a timer circuit coupled to the gate driver and having a time constant.

6. The battery pack of claim 5, wherein the battery controller is further configured to:
   detect a connection to a charger;
   control the first switch to close;
   set a delay timer to the time constant of the timer circuit; and
   control the charging switch to close when the delay timer expires.

7. The battery pack of claim 6, wherein the battery controller is further configured to
   detect a condition for disabling charging of the plurality of battery cells;
   control the charging switch to open;
   set a second delay timer to the time constant of the timer circuit; and
   control the first switch to open when the second delay timer expires.

8. The battery pack of claim 7, further comprising a second switch for controlling the first switch, wherein the battery controller is coupled to the second switch to control the second switch, wherein the battery controller controls the first switch by controlling the second switch.

9. The battery pack of claim 1, further comprising a printed circuit board (PCB) coupled to the terminal block, wherein the charging switch and the fuse are provided adjacent the terminal block on the PCB.

10. The battery pack of claim 1, wherein the charging switch is a N-Channel power MOSFET.

11. A battery pack charging system comprising:
a charger configured to provide a charging current between about 6 Amperes and about 20 Amperes;
a battery pack detachably connectable to the charger and configured to be charged by the charger, the battery pack having a nominal capacity of up to about 6 Amp-hours (Ah) and including:
a plurality of battery cells;
a terminal block configured to be coupled to a power tool to provide operating power from the plurality of battery cells to the power tool, the terminal block having a positive power terminal, a charging terminal, and a ground terminal; and
a charging circuit provided between the charging terminal and the plurality of battery cells, the charging circuit configured to receive and transfer charging current above 12 Amperes to the plurality of battery cells during charging, wherein the charging circuit includes:
a charging switch; and
a fuse coupled between the charging terminal and the charging switch.

12. The battery pack charging system of claim 11, wherein the battery pack receives a charging current of about 12 Amperes for charging the plurality of battery cells, further comprising:
a second battery pack detachably connectable to the charger and configured to be charged by the charger, the second battery pack having a nominal capacity of between about 6 Ah and about 27 Ah including:
a second plurality of battery cells;
a second terminal block configured to be coupled to the power tool to provide operating power from the second plurality of battery cells to the power tool, the second terminal block having a second positive power terminal, a second charging terminal, and a second ground terminal; and
a second charging circuit provided between the second charging terminal and the second plurality of battery cells, the second charging circuit configured to receive and transfer charging current above 12 Amperes to the second plurality of battery cells during charging, wherein the second charging circuit includes:
a second charging switch; and
a second fuse coupled between the second charging terminal and the second charging switch,
wherein the second battery pack receives a charging current of about 18 Amperes for charging the second plurality of battery cells.

13. The battery pack charging system of claim 11, further comprising:
a battery controller coupled to the charging circuit;
a gate driver coupled between the battery controller and the charging switch, wherein the battery controller controls the charging switch using the gate driver;
a first switch coupled between the battery cells and the gate driver; and
a timer circuit coupled to the gate driver and having a time constant.

14. The battery pack charging system of claim 13, wherein the battery controller is further configured to:
detect a connection to a charger;
control the first switch to close;
set a delay timer to the time constant of the timer circuit; and
control the charging switch to close when the delay timer expires.

15. The battery pack charging system of claim 14, wherein the battery controller is further configured to detect a condition for disabling charging of the plurality of battery cells;
control the charging switch to open;
set a second delay timer to the time constant of the timer circuit; and
control the first switch to open when the second delay timer expires.

16. The battery pack charging system of claim 11, wherein the charging switch is a N-Channel power MOSFET.

17. A method for fast charging battery pack comprising:
connecting a charging switch between a charging terminal of a battery pack and a plurality of battery cells of the battery pack, the battery pack having a nominal capacity of up to about 27 Amp-hours (Ah);
connecting a fuse between the charging terminal and the charging switch; and
transferring a charging current above 12 Amperes to the plurality of battery cells during charging.

18. The method of claim 17, further comprising:
detecting, using a battery controller of the battery pack, a connection of the battery pack to a charger;
controlling, using the battery controller, a first switch to close, wherein the first switch is coupled between the plurality of battery cells and a gate driver of the charging switch;
setting, using the battery controller, a delay timer to a time constant of a timer circuit, wherein the timer circuit is coupled to the gate driver; and
controlling, using the batter controller, the charging switch to close when the delay timer expires.

19. The method of claim 18, further comprising:
detecting, using the battery controller, a condition for disabling charging of the plurality of battery cells;
controlling, using the battery controller, the charging switch to open;
setting, using the battery controller, a second delay timer to the time constant of the timer circuit; and
controlling, using the battery controller, the first switch to open when the second delay timer expires.

20. The method of claim 17, wherein the charging switch is a N-Channel power MOSFET.

* * * * *